United States Patent Office 3,373,001
Patented Mar. 12, 1968

3,373,001
INORGANIC POLYMERS
William C. Drinkard, Jr., Wilmington, Del., assignor to E. I. du Pont de Nemours and Company, Wilmington, Del., a corporation of Delaware
No Drawing. Filed Dec. 18, 1963, Ser. No. 331,379
16 Claims. (Cl. 23—358)

ABSTRACT OF THE DISCLOSURE

New $B_{10}$ boron-cage radicals and wholly inorganic polymers containing these $B_{10}$ boron-cage radicals and a process for their manufacture. The process comprises reacting a lower oxide of a Group V, VI, or VII element in a solution of $(H_3O)_2B_{10}H_{10}$ at a temperature of 0° C. to 50° C.

---

This invention concerns polymers containing $B_{10}$ boron-cage radicals and more particularly to wholly inorganic polymers containing $B_{10}$ boron-cages.

The term "boron cage" refers to the ten boron atoms which are present in the repeating units of the polymers of this invention and which are deemed to be joined to form a skeleton-like unit or cage in which each boron atom is adjacent to at least four other boron atoms. The manner in which the boron atoms are linked is not known but the group of which the ten boron atoms are a part functions as a unit in chemical reactions.

There has been considerable interest during recent years in boron chemistry and particularly in boron compounds containing relatively large proportions of boron. Some of these are disclosed in applicant's pending applications S.N. 220,909, filed Aug. 31, 1962, now abandoned; S.N. 220,910, filed Aug. 31, 1962; and S.N. 240,755, filed Nov. 28, 1962, but heretofore polymers containing only inorganic constituents and $B_{10}$ boron-cages in the skeletal chain have not been known. In accordance with this invention there are provided novel polymers characterized by wholly inorganic backbones containing at least two $B_{10}$ boron-cage radicals in combination with one or more elements having an atomic number of at least 15 and from Groups V, VI and VII of the Periodic Table of Elements (Hackh's Chemical Dictionary, 3rd ed. (1950)). The backbones of the polymers are free from carbon atoms. Organic and/or inorganic substitutents can be attached to backbones of these polymers but neither is necessary.

Polymers of this invention are characterized by the following structural units, including combinations thereof:

$$M_a[H\text{-}(B_{10}H_{8-b}X_bQ)_cB_{10}H_{9-b'}X_{b'}]_b \quad (1)$$

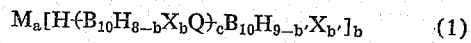

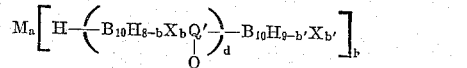
(2)

where:

M is a cation,
X is a group which can be bonded to a nuclear carbon of an aromatic ring having benzenoid unsaturation by replacement of hydrogen,
Q is

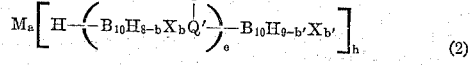

or mixtures thereof,
Q' is —As—, —Sb—, —Bi— or mixtures thereof,
b is a positive whole number from 0 to 8, inclusive,
b' is a positive whole number from 0 to 9, inclusive, a and h are positive whole numbers whose values are determined by the valence $(v_M)$ of M and the valence $(v_{bu})$ of the bracketed unit, $$(v_M) \cdot (a) = (v_{bu}) \cdot (h)$$

c, d and e are whole numbers, greater than zero, referring to the number of parenthetical units in the compound,
R is a monovalent hydrocarbon radical.

When X or R is or contains an organic radical, it may contain from 1 to 30 or more carbon atoms but preferably it contains 1–7 carbon atoms and is phenyl or a lower alkyl group (less than 8 carbon atoms). The term "cation" refers to an atom or group of atoms which forms a positively charged ion in aqueous solution. The term "hydrocarbon radical" refers to a radical of carbon and hydrogen, generally, of which alkyl, aryl, aralkyl, alkaryl and alicyclic radicals are particularly preferred species.

The values of c, d and e may range from one in the case of linear dimers to large whole numbers for polymers of the order of 32,000 molecular weight or more. The latter are usually gels and are normally insoluble in ordinary sovents other than dimethyl formamide, dimethyl acetamide, etc. Molecular weights of the products are generally governed by the mole ratio of the reactants used. For example, reaction of $(H_3O)_2B_{10}H_{10}$ with $SeO_2$ is a mole ratio of 1:1 produces a gel with high molecular weight having the formula $(B_{10}H_8Se \cdot 3H_2O)_n$ where n is a large whole number, but if only ½ mole $SeO_2$ is used, the product is the dimer $[B_{10}H_9SeB_{10}H_9]^=$, recoverable as a cesium salt $Cs_2[B_{10}H_9SeB_{10}H_9]$. Similarly, reaction of $As_2O_3$ with $(H_3O)_2B_{10}H_{10}$ in ratios less than 1:2 has produced the dimer ion

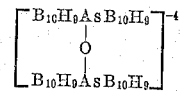

which is also recoverable as the cesium salt.

The oxides of other Group V, VI and VII elements mentioned above can likewise be utilized to produce similar polymers containing sulfur, antimony, tellurium, bismuth, phosphorus and halogens such as bromine and iodine, and combinations thereof.

Also, these polymers can be further reacted to attach substituents to the boron cages in the polymer as, for example, by halogenation. All, or less than all, of the hydrogen atoms in the boron-cage structure in the polymers can be replaced with halogens (Cl, Br, I or F). Also, reaction of one mole $HB_{10}H_9 \cdot DMF$ with one-half mole $SeO_2$ in water produces the dimer $$DMF \cdot B_{10}H_8SeB_{10}H_8 \cdot DMF$$

Evaporation of the solution produces a glass. Similarly, by substituting the other oxides mentioned above, for $SeO_2$, inorganic dimers of the Group V, VI and VII elements mentioned are attained having DMF terminal groups.

The polymers of this invention are prepared by reacting the $B_{10}H_{10}^=$ ion with a lower oxide of an element of one of the Group V, VI and VII elements mentioned above. Such a lower oxide is an oxide of one of these elements in which the latter exhibits a valence less than its maximum permissible valence state (e.g., less than 5 for Group V Elements, less than 6 for Group VI and less than 7 for Group VII). The reaction is carried out in an acidic solution (having a pH less than about 7) of the $B_{10}H_{10}^=$ ion. Preferably the reaction medium is fairly strongly acidic and has a pH of less than 2 because of the need for the $B_{10}H_{10}^=$ ion to be in the form of its hydronium salt $(H_3O)_2B_{10}H_{10}$. A convenient method of operation involves dissolving a salt such as $(NH_4)_2B_{10}H_{10}$ or $Na_2B_{10}H_{10}$ in water or other suitable solvent, adding a lower oxide of Group V, VI or VII element and acidifying by bubbling HCl gas through the reaction mixture or by addition of another acid such as HBr, $H_2SO_4$, $H_3PO_4$, toluene sulfonic acid, acetic acid, trifluoroacetic acid or the like. If desired, the $B_{10}H_{10}^=$ ion can be used in its acidic form $H_2B_{10}H_{10}$ in which case no additional acid need be used.

Preferred oxides for carrying out the process of this invention are lower oxides or substituted oxides of sulfur, selenium, tellurium, arsenic, antimony, bismuth, phosphorus and iodine. These are conveniently used in the form of $SO_2$, $SeO_2$, $TeO_2$, $As_2O_3$, $Sb_2O_3$

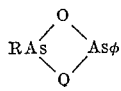

$Bi_2O_3$, $P_2O_3$, $RIO_2$ and $HIO_3$, respectively, or their solvates ($H_2SO_3$, $H_2SeO_3$, $As(OH)_3$, etc.) where R is a monovalent hydrocarbon radical, but other forms can be used.

The parent oxides useful in this invention contain at least one unit of the following generic structure:

where (:) represents a non-bonding electron pair attached to Y, Y is Q or Q' as defined above; $k$, $p$, $m$ and $n$ are small whole numbers; R is a monovalent hydrocarbon radical; $k$ is 1; $p$ is 0, 1, 2 or 3; $m$ is 0, 1, 2 or 3; $n$ is 0 or 1 and the sum of $k+m+n+$(number of electron pairs bonding oxygen atoms to Y)$=4$. Representative examples of oxides fitting the above formula are shown in the following table with the values of $p$, $m$ and $n$ indicated.

| Oxide | $p$ | $m$ | $n$ | Electron pairs bonding O to Y |
|---|---|---|---|---|
| $As(OH)_3$ | 0 | 3 | 0 | 0 |
| $As_2O_3$ | 3 | 0 | 0 | 3 |
| $Sb(OH)_3$ | 0 | 3 | 0 | 0 |
| $SO_2$ | 2 | 0 | 0 | 3 |
| $HIO_3$ | 2 | 1 | 0 | 3 |
| $RIO_2$ | 2 | 0 | 1 | 3 |
| $Bi_2O_3$ | 3 | 0 | 0 | 3 |
| $Sb_2O_3$ | 3 | 0 | 0 | 3 |
| $P_2O_3$ | 3 | 0 | 0 | 3 |
| $TeO_2$ | 2 | 0 | 0 | 3 |
| $SeO_2$ | 2 | 0 | 0 | 3 |
| R—As(O)(O)As—R (cyclic) | 2 | 1 | 0 | 2 |
| R—S(OH)=O | 1 | 1 | 1 | 1 |
| $H_2SO_3$ | 1 | 2 | 0 | 1 |

The reaction of this invention is carried out in a solution of the $B_{10}H_{10}^=$ ion in a suitable innocuous solvent such as water, dimethyl formamide, dimethyl acetamide, an alcohol, acetonitrile, N-methyl pyrrolidone and the like. The solvent is not critical and any innocuous liquid which dissolves the boron compound can be used. Sometimes the oxide reagent is not soluble in the solvent and the reaction is a two phase reaction.

The reaction of this invention is exothermic and can be conducted at normal room temperature and lower (even at 0° C. in some instances) but slight warming above room temperature is sometimes desirable to shorten the reaction time. With certain oxides cooling may be necessary to prevent overheating. Usually temperatures above about 100° C. are unnecessary and the boiling point of the reaction solution should not be exceeded. Completion of the reaction is indicated by gel formation or increasing viscosity of the reaction solution when the product is a high molecular weight polymer. When low molecular weight polymers are prepared, completion of the reaction is usually indicated by a change in color of the solution. In any event disappearance of the oxide reagent signifies that reaction is completed.

In Formulas 1 and 2 above, the component represented by X is defined as a group capable of bonding to a ring carbon of an aromatic ring by a replacement of hydrogen. An aromatic ring is defined as one possessing benzenoid unsaturation (e.g., as in benzene, naphthalene, xylene, etc.) The group X is preferably a halogen or a monovalent group bonded to boron in the $B_{10}$ cage through nitrogen, carbon, oxygen or sulfur as, for example, in the following groups: amino, substituted amino, nitroso, nitro, azo, alkyl, alkenyl, alkynyl, aryl, alkaryl and aralkyl, cyano, carboxyl, hydroxy, hydrocarbonyloxy, hydrocarbyloxy, thiol, hydrocarbylmercapto, sulfo, sulfonyl and sulfamyl.

The group X can be a substituent on the boron cage prior to polymerization or can be introduced into the polymers of this invention by direct reaction with those polymers or by substitution for or modification of a group which has been introduced into the polymer by direct reaction (e.g., a substituent obtained by reduction, esterification, hydrolysis, dehydration, or amidation of directly introduced groups). Substituents which are introduced by direct reaction are preferred. Thus, X may be a mixture of the above groups.

Examples of groups included within the scope of X are as follows: halogens (F, Cl, Br, I), hydrocarbon, carboxyl $$(-\overset{O}{\underset{\|}{C}}-OH)$$

carbamyl and N-substituted carbamyl $$\left(-\overset{O}{\underset{\|}{C}}-NH_2,\ -\overset{O}{\underset{\|}{C}}-NHR',\ -\overset{O}{\underset{\|}{C}}-NR'_2\right)$$

halocarbonyl $$(-\overset{O}{\underset{\|}{C}}-Y)$$

where Y is F, Cl, Br, I, halomethyl (—$CH_2Y'$, where Y' is F, Cl, Br, I), hydroxy (—OH), hydrocarbyloxy (—OR'), acetal [—$CH(OR')_2$], ketal [—$CR'(OR')_2$], hydrocarbylcarbonyloxy [—OC(O)R'], hydrocarbyloxycarbonyl [—C(O)OR'], isocyanate (—NCO), thiocyanate (—CNS), isothiocyanate (—NCS), hydrocarbylthio (—SR'), hydroxymethyl (—$CH_2OH$), hydrocarbyloxymethyl (—$CH_2OR'$), dihydrocarbylaminomethyl (—$CH_2NR'_2$), cyano (—CN), amino (—$NH_2$), substituted amino (—NHR', —$NR'_2$), trihalomethyl (—$CCl_3$, $CF_3$, etc.)

$$\text{acyl } (-\overset{O}{\underset{\|}{C}}-R'), \text{ aldehyde } (-\overset{O}{\underset{\|}{C}}-H)$$

nitro (—$NO_2$), nitroso (—NO), azo (—N=N—Ar, where Ar is an aromatic hydrocarbon of up to 10 carbons), sulfo (—$SO_3H$), sulfonyl (—$SO_2R'$), and acetoxymercury $$(-\text{HgO}\overset{O}{\underset{\|}{C}}CH_3)$$

R', where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons.

Examples of reagents which are within the scope of the above definition and which are operable in the process of the invention are given below, together with the substituent group which in the process is bonded to boron in the final product.

| Reagent | Group Bonded to Boron |
|---|---|
| Halogens ($F_2$, $Cl_2$, $Br_2$, $I_2$) | Halogen (F, Cl, Br, I) |
| Nitric acid | $-NO_2$ |
| $H_2NOSO_3Na$ | $-NH_2$ |
| Olefins | $-$alkyl [e.g., $-C_2H_5$, $-CH(CH_3)_2$] |
| Alkyl halides | $-$alkyl |
| Acyl halides | $-\overset{O}{\overset{\|}{C}}-R^5$ |
| $Hg(O\overset{O}{\overset{\|}{C}}CH_3)_2$ | $-Hg O\overset{O}{\overset{\|}{C}}CH_3$ |
| $(CN)_2C=C(CN)_2$ | $-(CN)C=C(CN)_2$ |
| $COCl_2$ | $-\overset{O}{\overset{\|}{C}}Cl$ and $-\overset{O}{\overset{\|}{C}}-$ |
| $CO/HCl$ | $-\overset{O}{\overset{\|}{C}}H$ |
| $C_6H_5N(CH_3)CHO/POCl_3$ | $-\overset{O}{\overset{\|}{C}}H$ |
| $R^5SO_2Cl$ | $-SO_2-R^5$ |
| $R_2^5N\overset{O}{\overset{\|}{C}}Cl$ | $-\overset{O}{\overset{\|}{C}}NR_2^5$ |
| $R^5\overset{O}{\overset{\|}{C}}H$ and $R_2^5CO$ | $-OR^5$ |
| $(H_3O)^+Cl^-$ (hydronium salt) | $-OH$ |
| $R^5SCl$ | $-SR^5$ |

In the above groups, $R^5$ is a monovalent organic radical, preferably hydrocarbon of at most 18 carbons, which can be alkyl, alkenyl, cycloalkyl, cycloalkenyl, aryl, alkaryl, aralkyl and the like.

In the reactions employing the above reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of compounds of the formula $H(B_{10}H_9 \cdot Z)$. The reagents are materials which are usually readily available or which are obtained by conventional methods.

Reaction of the boron compounds of Formulas 1 or 2 or a combination thereof to replace hydrogens on the boron cages with substituent groups is conducted in conventional vessels with corrosion-resistant inner surfaces, e.g., glass, platinum, poly(tetrafluoroethylene)resin, and the like. The boron-containing reactant, and optionally an inert liquid solvent, is charged into the reaction vessel. The reactant containing the group to replace hydrogen on the boron cage is then supplied to the reaction vessel at a temperature and at a rate which will provide a controllable reaction and which will bring the reaction to completion within a reasonable time. When reactants are employed which are hydrolytically stable, water or alcohols (methanol, ethanol) can be used conveniently as a medium for the reaction. Other solvents can be used, for example, diethyl ether, benzene, heptane, carbon tetrachloride, carbon disulfide and the like.

The temperature at which the reaction is conducted will be determined largely by the reactivity of the substituting reagent. In general, the temperature will be between about $-20°$ and $200°$ C. Preferably, the temperature will be between about $0°$ and about $150°$ C.

The time of reaction in a batch process will also depend to a considerable extent on the reactivity of the reactants used. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but is not essential to use pressure. In most cases the reaction proceeds satisfactorily at atmospheric pressure.

The proportions in which the reactants are used are not critical. It is preferable, in order to obtain maximum yield of desired product, to use at least one mole of the substituting reactant for each hydrogen which is to be replaced on the boron-containing reactant. It is not essential, however, that these ratios be used.

Compounds of Formula 2 are preferred for practical utility as being more stable than the linear polymers of Formula 1. The molecular weights of both the linear polymers and the cross-linked polymers of Formula 2 may range from that of the dimers to more than 30,000. The cross-linked polymers are particularly suitable for preparing articles of predetermined shape as by molding, forming unsupported films and the like. Sulfur containing $B_{10}$ cage inorganic polymers possess antistatic properties.

Halogenation of the polymers of this invention to replace hydrogen atoms on the boron cages with halogen atoms can be conducted very simply after suspending the $B_{10}$ compound in water. The desired halogen is admixed with the solution at room temperature. Sometimes heating is necessary if a large number of halogens are to be substituted on each cage. The reaction is exothermic and its completion is usually signified by a temperature decline and/or by a color discharge. As many as eight halogens can be substituted on each $B_{10}$ cage in the polymer; nine halogens on the terminal groups.

The exact structural formula for the cross-linked polymers of this invention has been carefully investigated and all available evidence points to a structure of Formula 2 above in which Q's are connected by a cross-linking oxygen group.

When $b$ and $b'$ in Formulas 1 and 2 are zero, the polymers have the simple formulas:

$$M_a[H(B_{10}H_8Q)_c B_{10}H_9]_h \qquad (5)$$

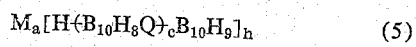

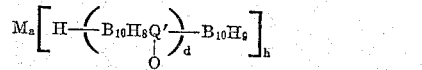

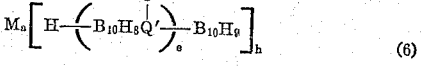

(6)

where the letters have the same meanings as above. These are the preferred forms of the polymers because of their greater simplicity, the ease of their production and the absence of extraneous substituents which may be undesirable in certain applications.

The following are representative polymers and recurring units of polymers of this invention:

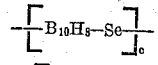

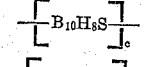

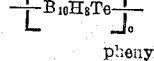

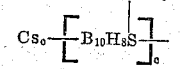

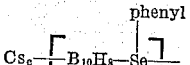

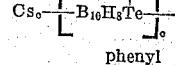

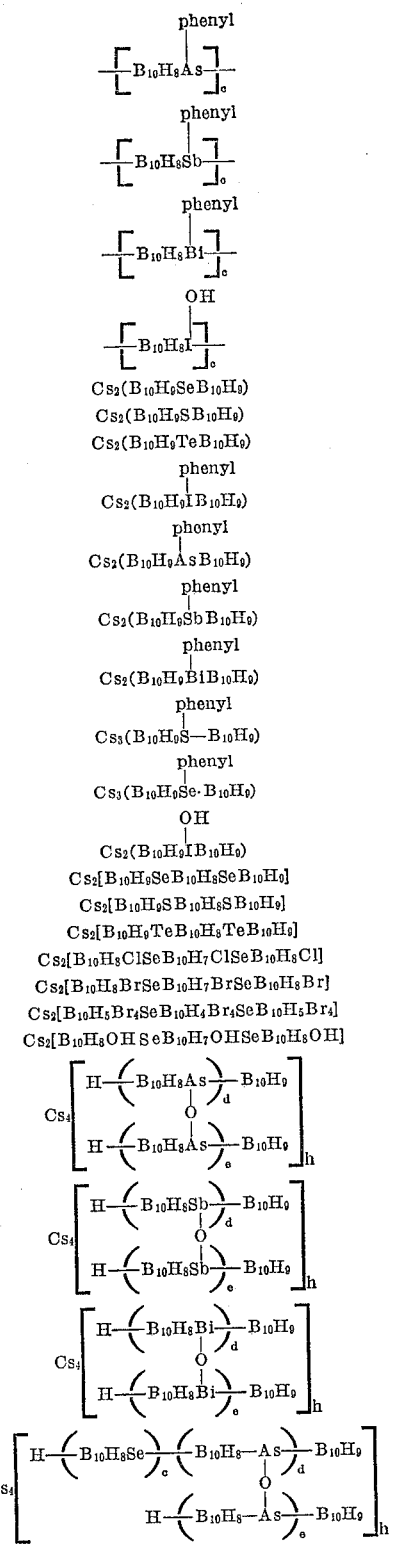

Cs₂(B₁₀H₉SeB₁₀H₉)
Cs₂(B₁₀H₉SB₁₀H₉)
Cs₂(B₁₀H₉TeB₁₀H₉)

Cs₂(B₁₀H₉IB₁₀H₉)

phenyl
|
Cs₂(B₁₀H₉AsB₁₀H₉)

phenyl
|
Cs₂(B₁₀H₉SbB₁₀H₉)

phenyl
|
Cs₂(B₁₀H₉BiB₁₀H₉)

phenyl
|
Cs₃(B₁₀H₉S—B₁₀H₉)

phenyl
|
Cs₃(B₁₀H₉Se·B₁₀H₉)

OH
|
Cs₂(B₁₀H₉IB₁₀H₉)

Cs₂[B₁₀H₈SeB₁₀H₈SeB₁₀H₈]
Cs₂[B₁₀H₈SB₁₀H₈SB₁₀H₈]
Cs₂[B₁₀H₉TeB₁₀H₈TeB₁₀H₉]
Cs₂[B₁₀H₈ClSeB₁₀H₇ClSeB₁₀H₈Cl]
Cs₂[B₁₀H₈BrSeB₁₀H₇BrSeB₁₀H₈Br]
Cs₂[B₁₀H₅Br₄SeB₁₀H₄Br₄SeB₁₀H₅Br₄]
Cs₂[B₁₀H₈OHSeB₁₀H₇OHSeB₁₀H₈OH]

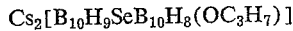

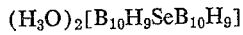

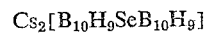

In the above examples "phenyl" is simply illustrative of a preferred hydrocarbon radical. It can be replaced by other monovalent hydrocarbon radicals such as alkyl, aralkyl, alkaryl and alicyclic radicals.

PREPARATION OF (NH₄)₂B₁₀H₁₀

A reaction vessel having a capacity of about 365 parts of water is charged with 0.79 part of decaborane (14), cooled in liquid nitrogen, and then evacuated to a pressure of 10 microns of mercury. Approximately 21 parts of methyl sulfide is condensed onto the decaborane in the reaction vessel. The reaction vessel is closed, allowed to warm to room temperature (about 25° C.) and stand for 4 days. During this period, 6.6 millimoles of hydrogen is evolved. The reaction vessel is opened and excess methyl sulfide is removed by distillation, leaving a practically quantitative yield of white solid residue of $B_{10}H_{12} \cdot 2S(CH_3)_2$. The compound is recrystallized from ethyl acetate and it melts at 122–124° C. The compound is called bis(dimethylsulfide)decaborane(12).

Bis(dimethylsulfide)decaborane(12) (8.5 g.) is mixed with 50 milliliters of liquid ammonia and stirred in a round-bottom reaction vessel for one hour with the vessel being cooled to a temperature of about −50° C. by partial immersion in a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of diammonium decahydrodecaborate(2−), i.e., $(NH_4)_2B_{10}H_{10}$.

The invention will be more clearly understood by referring to the examples which follow. All parts are by weight unless otherwise indicated.

*Example 1*

[B₁₀H₈Se·3H₂O]ₙ

A solution of 15.4 g. of $(NH_4)_2B_{10}H_{10}$ dissolved in 20 ml. of water is passed through an "Amberlite IR–120–H" ion exchange column to produce the acid, $(H_3O)_2B_{10}H_{10}$. A solution of 10.8 g. of $SeO_2$ in 30 ml. of water is added and the solution stirred well. The solution gradually darkens to a deep red-brown color and after approximately 20 minutes it sets to a firm red-brown gel. The product is purified by washing with water. It is dried in a nitrogen atmosphere.

*Analysis.*—Calcd. for [B₁₀H₈Se·3H₂O]ₙ: Se, 31.7; H, 5.6. Found: Se, 31.6; H, 5.3. End group titration indicates that n=21. The gel is insoluble in all solvents tried. However, dilute solutions of the polymer are prepared by the reaction of $SeO_2$ and $H_2B_{10}H_{10}$ in DMF.

Other solvents may be used for polymer formation, for example, ethanol and other nonbasic solvents which dissolve salts or the acid form of the $B_{10}H_{10}^=$ ion.

$(NH_4)_2B_{10}H_{10}$ can be used directly by addition of HCl to the solution.

*Example 2*

Cs₂[B₁₀H₉SeB₁₀H₈(OC₃H₇)]

A solution of 1.0 g. of Cs₂[B₁₀H₉SeB₁₀H₉] in 20 ml. of warm water is passed through an "Amberlite IR–120–H" ion exchange column to produce the acid, (H₃O)₂[B₁₀H₉SeB₁₀H₉]

The solution is evaporated in vacuum at 25° C. to give a gummy residue. The residue is suspended in 20 ml. of glyme and six drops of propylene oxide are added. The temperature rises rapidly to approximately 32° C. The reaction mixture is allowed to stir for one hour and then the glyme is evaporated in vacuum at 25° C. The residue is dissolved in a mixture of 20 ml. of ethanol and 20 ml. of water and the product precipitated as a yellow solid by the addition of a solution of CsF in ethanol. Product is recovered by centrifugation and purified by washing with ethanol.

*Analysis.*—Calcd. for Cs₂[B₁₀H₉SeB₁₀H₈(OC₃H₇)]: C, 5.66; H, 3.76. Found: C, 6.42; H, 3.79.

That the propyloxy group is attached directly to the boron cage is confirmed by the infrared spectrum of the product showing a B—O bond.

*Example 3*

Cs₂[B₁₀H₉SeB₁₀H₉]

A solution of 7.7 g. of $(NH_4)_2B_{10}H_{10}$ in 20 ml. of water is passed through an "Amberlite IR–120–H" ion exchange column to produce the acid $(H_3O)_2B_{10}H_{10}$. A solution of 2.7 g. of $SeO_2$ in 25 ml. of water is added dropwise to the solution of $(H_3O)_2B_{10}H_{10}$. The solution immediately becomes dark red-brown in color. The product is recovered by the addition of an aqueous solution of 15.0 g. of CsF. $Cs_2[B_{10}H_9SeB_{10}H_9]$ precipitates as a light brown gelatinous solid which may be purified by recrystallization from water.

*Analysis.*—Calcd. for $Cs_2[B_{10}H_9SeB_{10}H_9]$: Se, 13.6; Cs, 46.0; H, 3.11. Found: Se, 14.07; Cs, 48.4; H, 2.54.

The equivalent weight of the product is found to be 285. Theoretical equivalent for $Cs_2[B_{10}H_9SeB_{10}H_9]$ is 287. The structure of the product is further supported by IR, UV and NMR spectra. Conductivity measurements show that the anion has a valence of two.

Example 4

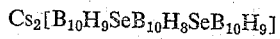

A solution of 7.2 g. of $(NH_4)_2B_{10}H_{10}$ is dissolved in 20 ml. of water and the solution is passed through an "Amberlite IR-120-H" ion exchange column to produce the acid, $(H_3O)_2B_{10}H_{10}$. A solution of 4.13 g. of $SeO_2$ in 20 ml. of water is added dropwise to the solution of $(H_3O)_2B_{10}H_{10}$. The solution becomes dark red-brown in color. Product is precipitated as a dark tan colored solid by the addition of 15.0 g. of CsF dissolved in 25 ml. of water. The product is insoluble in hot water. It is purified by repeated washings with water.

*Analysis.*—Calcd. for $Cs_2[B_{10}H_9SeB_{10}H_8SeB_{10}H_9]$: Se, 20.2; Cs, 34.4; H, 3.36. Found: Se, 20.37; Cs, 35.9; H, 3.60.

Example 5

$(H_3O)_2[B_{10}H_9SeB_{10}H_9]$

A solution of 1.0 g. of $Cs_2[B_{10}H_9SeB_{10}H_9]$ in 20 ml. of water is passed through an "Amberlite IR-120-H" ion exchange column. The acid solution which results is evaporated to dryness in vacuum at 25° C. The red-brown residue is dried in vacuum over $P_2O_5$ for 40 minutes at 25° C.

*Analysis.*—Calcd. for $(H_3O)_2[B_{10}H_9SeB_{10}H_9]$: Se, 22.48. Found: Se, 23.21.

The acid, which is a solid, is a strong acid. Both protons titrate together (with NaOH).

Example 6

$Cs_2[HOB_{10}H_8SeB_{10}H_8OH]$

A solution of 10.0 g. of $Cs[B_{10}H_9 \cdot DMF]$ in 100 ml. of water is passed through an "Amberlite IR-120-H" ion exchange column to produce the acid $(H_3O)[B_{10}H_9 \cdot DMF]$ A solution of 1.72 g. of $SeO_2$ in 10 ml. of water is added dropwise to the $(H_3O)[B_{10}H_9 \cdot DMF]$ solution. The solution immediately becomes deep red-brown but no solid forms. Water is removed from the solution by evaporation in a stream of air. A red-brown glass results. The glass is dissolved in 20 ml. of 10% KOH and the solution is heated at 50–60° C. in a stream of $N_2$ until the odor of $HN(CH_3)_2$ is no longer present. The solution is cooled to 25° C. and the product is precipitated by the addition of an aqueous solution of CsF. The solid is recovered by centrifugation and washed with ethanol.

*Analysis.*—Calcd. for $Cs_2[(HO)B_{10}H_8SeB_{10}H_8(OH)]$: Cs, 43.52; Se, 12.92. Found: Cs, 45.7; Se, 12.27.

An infrared spectrum shows that the hydroxyl groups are attached directly to the boron cage.

Example 7

$[(CH_3)_4N]_2[B_{10}H_5Cl_4SeB_{10}H_5Cl_4]$

Chlorine gas is bubbled into a suspension of 1.0 g. of $Cs_2[B_{10}H_9SeB_{10}H_9]$ in 20 ml. of water. The temperature rises gradually to approximately 70° C. and the solid dissolves. Chlorine gas is bubbled into the solution for 30 minutes. At the end of this time the temperature has dropped to approximately 40° C. The solution is then cooled to 25° C. and the product is precipitated by the addition of $[(CH_3)_4N]Cl$. The brown gelatinous product is recovered by centrifugation and purified by repeatedly washing with water (six times).

*Analysis.*—Calcd. for $[(CH_3)_4N]_2[B_{10}H_5Cl_4SeB_{10}H_5Cl_4]$:

N, 3.8; Se, 11.7; Cl, 38.5. Found: N, 3.4; Se, 11.99; Cl, 41.1.

Example 8

$Cs_2[B_{10}H_4Br_5SeB_{10}H_4Br_5]$

A solution of 7.2 g. of $(NH_4)_2B_{10}H_{10}$ in 20 ml. of water is passed through an "Amberlite IR-120-H" ion exchange column to produce the acid $(H_3O)_2B_{10}H_{10}$. A solution of 2.7 g. of $SeO_2$ in 25 ml. of water is added dropwise to the $(H_3O)_2B_{10}H_{10}$ solution. The solution becomes deep red-brown in color. Elemental $Br_2$ is then added dropwise to the solution. A sharp rise in temperature is noted and the temperature is maintained at approximately 50° C. by cooling during the addition of $Br_2$. When 57 g. of $Br_2$ is added there is no evidence of heat evolution and $Br_2$ vapor is present above the solution. Excess $Br_2$ is removed by bubbling $N_2$ through the solution. Product is precipitated as a yellow-orange solid by the addition of 15.0 g. of CsF dissolved in 20 ml. of water. The product is purified by washing with water.

*Analysis.*—Calcd. for $Cs_2[B_{10}H_4Br_5SeB_{10}H_4Br_5]$: Se, 5.61; Br, 57.86. Found: Se, 5.5; Br, 55.7.

Example 9

$Cs_2[B_{10}H_{6.5}I_{2.5}SeB_{10}H_{6.5}I_{2.5}]$

An aqueous solution of $I_2$—KI is added dropwise to a solution of 1.0 g. of $Cs_2[B_{10}H_9SeB_{10}H_9]$ in 10 ml. of water. The reaction mixture is maintained at 50° C. during the addition of $I_2$. Addition is continued until the color of $I_2$ persists. The solution is then cooled to 25° C. The product separates as an orange-yellow solid.

*Analysis.*—Calcd. for $Cs_2[B_{10}H_{6.5}I_{2.5}SeB_{10}H_{6.5}I_{2.5}]$: Se, 6.55; I, 52.5. Found: Se, 6.64; I, 54.74.

Example 10

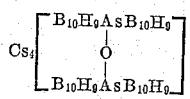

A solution of 15.4 g. of $(NH_4)_2B_{10}H_{10}$ dissolved in a minimum amount of water is passed through an "Amberlite IR-120-H" ion exchange column to produce the acid, $(H_3O)_2B_{10}H_{10}$. Approximately 175 ml. of eluent is collected. To this solution is added 4.92 g. of $As_2O_3$ and the mixture is heated at 60° C. until the arsenic trioxide dissolves. This process requires 3–4 hours. At the end of this time a yellow-orange solution forms. The small amount of solid which is present is removed by filtration, and the product is precipitated from the filtrate by the addition of 30 g. of CsF dissolved in water. The mixture is cooled in ice and filtered. The product is recrystallized from hot water.

*Analysis.*—Calcd. for

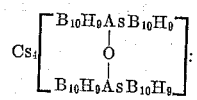

Cs, 46.2; As, 13.05; O, 1.3. Found: Cs, 46.3; As, 13.24; O, 0.77. Calculated equivalent weight: 287. Found: 282, 287, 282.

Example 11

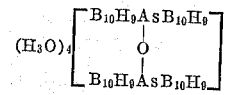

A solution of 1 g. of

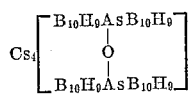

dissolved in a minimum amount of water is passed through an "Amberlite IR–120–H" ion exchange column. The solvent is evaporated in vacuum at 25° C. and the residue is dried in vacuum over $P_2O_5$ at 25° C. for 40 minutes.

*Analysis.*—Calcd. for

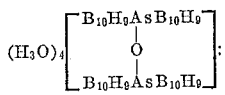

As, 21.6. Found: As, 22.07.

Example 12

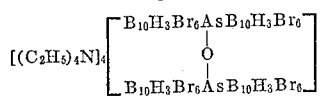

A solution of $Br_2$ in aqueous KBr is added dropwise to a hot aqueous solution of 1 g. of

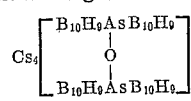

(10 ml.) Addition of $Br_2$ is continued until the color of the $Br_2$ persists for five minutes. The solution is cooled to 0° C., and the product is recovered as a white solid when $(C_2H_5)_4NCl$ is added to the cold solution. The product is recovered by centrifugation and purified by repeatedly washing with water.

*Analysis.*—Calcd. for

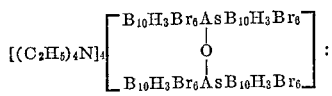

C, 12.7; H, 3.0; N, 1.85; Br, 63.2; As, 4.94. Found: C, 11.03; H, 3.0; N, 1.78; Br, 60.38; As, 4.05.

Example 13

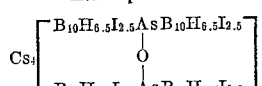

A solution of $I_2$ in aqueous KI is added dropwise to a hot aqueous solution of 1 g. of

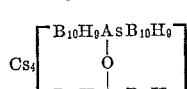

(10 ml.). Addition of $I_2$ is continued until the color of the iodine is no longer discharged. On cooling to 25° C. a light yellow solid crystallizes. The solid is recovered by filtration and washed with water, ethanol and ether.

*Analysis.*—Calcd. for

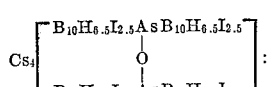

I, 52.7; B, 17.9. Found: I, 51.72; B, 16.73.

Example 14

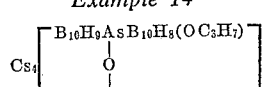

A solution of 1 g. of

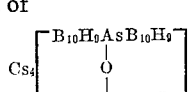

in 20 ml. of water is passed through an "Amberlite IR–120–H" ion exchange column to produce the acid

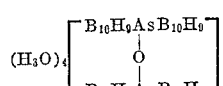

The solution is evaporated in vacuum at 25° C. to give a light yellow oil. The oil is suspended in 20 ml. of glyme (ethylene glycol dimethyl ether), and six drops of propylene oxide are added. A dark red-brown gum results. Addition of 10 ml. of water to the mixtures causes the gum of dissolve to give an orange solution. A solution of CsF in ethanol is added until precipitation of the gelatinous product is complete. Product is recovered by centrifugation and purified by washing with water, ethanol and ether.

*Analysis.*—Calcd. for

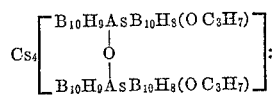

C, 5.67; H, 3.80. Found: C, 5.47; H, 3.77.

That the propyloxy group is attached directly to the boron case is confirmed by the infrared spectrum of the product.

Example 15

Solid $As_2O_3$ (0.98) is suspended in a solution of 1.54 g. of $(NH_4)_2B_{10}H_{10}$ in 75 ml. of dimethyl formamide. Then HCl gas is bubbled into the mixture for six minutes. During this time, the solution becomes hot, the $As_2O_3$ dissolves to give a yellow solution and there is a noticeable increase in the viscosity of the solution. The polymer remains in solution in DMF, but it may be recovered as a light yellow solid by adding the DMF solution to water. The polymer has the formula $[B_{10}H_8As]_n$. Molecular weight by light scattering equals 32,400.

Example 16

A solution of 0.73 g. of $Sb_2O_3$ in 10 ml. of concentrated HCl is added to a solution of 7.7 g. of $(NH_4)_2B_{10}H_{10}$ in 30 ml. of water. The solution is then heated at 50° C. for one hour. During this time, the solution becomes red-brown in color. The solution is cooled to 25° C., and the product is precipitated by the addition of 15.0 g. of CsF dissolved in a minimum amount of water. The orange-brown solid is purified by recrystallization from water and identified as

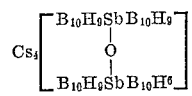

Example 17

A solution of 7.7 g. of $(NH_4)_2B_{10}H_{10}$ is passed through an "Amberlite IR–120–H" ion exchange column to produce the acid $(H_3O)_2B_{10}H_{10}$. To this solution is added 2.46 g. of solid $As_2O_3$, and the mixture is warmed at 50–60° C. until the solid has dissolved. A solution of 2.7 g. of $SeO_2$ in 25 ml. of water is then added and the mixture allowed to stand. Within fifteen minutes the solution sets to a brown gel. Attempts to recover the gel after washing with water are unsuccessful. The material disperses and cannot be recovered by centrifugation. Addition of an aqueous solution of 3.7 g. of CsF causes the gel to lighten in color, and it is then possible to centrifuge the gel for recovery. The solid is purified by washing with water and identified as

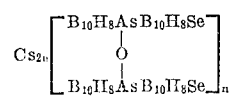

Yield is 10.7 g.

Analysis.—Calcd. for

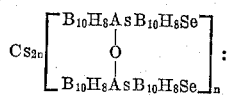

As, 14.00; Se, 14.75. Found: As, 13.24; Se, 14.72.

Example 18

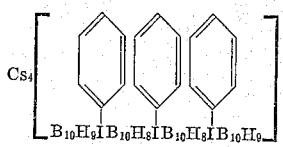

Solid $C_6H_5IO_2$ (2.36 g.) is sprinkled into a well stirred solution of 3.08 g. of $(NH_4)_2B_{10}H_{10}$ in 30 ml. of water. The temperature rises to 35° C. and a grey gum forms in a clear colorless solution. Liquid is removed by decantation and a concentrated solution of 6.0 g. of CsF in water added. A white solid forms immediately. Solid product is recovered by filtration and recrystallized from hot water. It is identified as

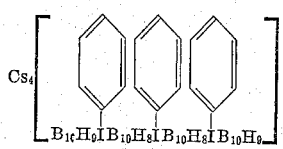

Calculated: Cs, 33.0; C, 13.4; H, 3.04; I, 28.8. Found: Cs, 33.0; C, 12.61; H, 3.17; I, 24.14.

Example 19

A solution of 7.7 g. of $(NH_4)_2B_{10}H_{10}$ is dissolved in a minimum amount of water, and the solution is poured through an "Amberlite IR-120-H" ion exchange column to produce the acid $(H_3O)_2B_{10}H_{10}$. To this acid solution is added 2.47 g. $As_2O_3$. Five milliliters of concentrated hydrochloric acid is added, and the solution is heated at 70–100° C. for one hour. During the heating, the polymer separates as a gel. The gel is broken by stirring, and solid product is recovered by centrifugation. Excess water is removed by drying in vacuum at 25° C. over $P_2O_5$. The product is

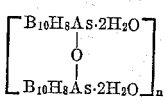

Analysis.—Calcd. for

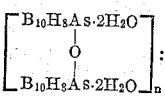

As, 33.0. Found: As, 33.89; 32.93.

Example 20

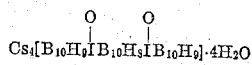

A solution of 5.91 g. of $NaIO_3$ in 60 ml. of water is added dropwise to a well stirred solution of 9.24 g. of $(NH_4)_2B_{10}H_{10}$ and 15 ml. of concentrated HCl in 30 ml. of water. When addition is complete the reaction is a light yellow solution containing a small amount of white solid. Solid is removed by filtration and 18 g. of CsF in water is added. A yellow solid forms immediately and is recovered by filtration and recrystallized from hot water. It is identified as

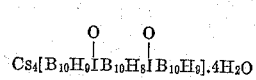

Calculated: Cs, 42.8; B, 26.0; I, 20.1. Found: Cs, 42.6; B, 26.03; I, 20.47.

Example 21

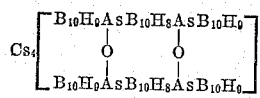

A solution of 7.7 g. (0.05 mole) of $(NH_4)_2B_{10}H_{10}$ was passed through an "Amberlite IR-120-H" ion exchange column to give the acid $(H_3O)_2B_{10}H_{10}$. To the solution was added 2.46 g. (0.025 mole) of $As_2O_3$ and the mixture was warmed at 50–60° C. until all of the $As_2O_3$ had dissolved. Addition of aqueous CsF to the yellow solution resulted in the precipitation of crude product. Fractional crystallization from water gave a product which corresponds to the formula

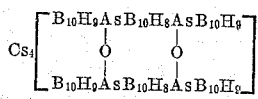

Yield was 2.9 g.

Example 22

Fractional crystallization of a product prepared according to the procedure of Example 20 resulted in an isolation of a more highly polymerized species.

Analysis.—Calcd. for

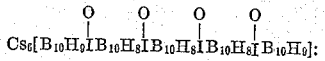

Cs, 40.8; B, 27.6; I, 26.0. Found: Cs, 41.1; B, 26.71; I, 26.35.

Example 23

$[B_{10}H_8S]_n$

A solution of 15.4 g. (0.01 mole) of $(NH_4)_2B_{10}H_{10}$ and 10.8 g. (0.1 mole) of $NaHSO_3$ in 125 ml. of water was treated with 43 ml. of concentrated HCl. Within 15 minutes the yellow solution sets to a light amber gel. The product was washed with water in a Waring Blendor and recovered by centrifugation. Water was removed in vacuum at 25° C. and final drying was accomplished in vacuum over $P_2O_5$. Yield was 14.6 g., 100%.

Example 24

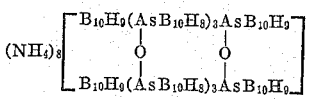

The addition of a solution of 9.84 g. (0.05 mole) of $As_2O_3$ in 50 ml. of concentrated HCl to a solution of 15.4 g. (0.1 mole) of $(NH_4)_2B_{10}H_{10}$ in 50 ml. of water resulted in the immediate formation of a light yellow gel. The product was washed five times with water in a Waring Blendor, and finally it was washed with a dilute solution of ammonia to assure complete conversion to the ammonium salt. The product was dried in vacuum over $P_2O_5$. Yield was 13.3 g., 100%.

Example 25

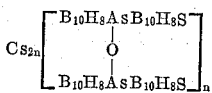

An aqueous solution of 7.7 g. (0.05 mole) of $(NH_4)_2B_{10}H_{10}$ was passed through an "Amberlite IR-120-H" ion exchange column to produce the acid $(H_3O)_2B_{10}H_{10}$. A solution of 2.7 g. (0.025 mole) of $NaHSO_3$ was added, and the solution was allowed to stand for 30 minutes. At the end of this time 2.46 g. (0.025 mole) of $As_2O_3$ in 30 ml. of concentrated HCl was added and the reaction was allowed to stand overnight. A deep amber color developed, but no gel formed. Product was recovered by the addition of a solution of 15.0 g. of CsF. Yield was 11.5 g.

Example 26

$[B_{10}H_8SeB_{10}H_8S]_n$

A solution of 7.7 g. (0.05 mole) of $(NH_4)_2B_{10}H_{10}$ was passed through an "Amberlite IR–120–H" ion exchange column to produce the acid $(H_3O)_2B_{10}H_{10}$. To this solution was added a solution of 2.7 g. (0.025 mole) of $NaHSO_3$ and the reaction was allowed to stand for 30 minutes. Then a solutiton of 2.7 g. (0.025 mole) of $SeO_2$ in 20 ml. of water was added and the reaction allowed to stand overnight. No gel formed. A product was precipitated by the addition of aqueous CsF. Yield was 15.7 g.

The compounds of this invention are generally useful in the preparation of unsupported films, coating compositions or molded products and particularly in applications where compositions containing a large concentration of boron per unit weight are desirable. They may also be used in pyrotechnics to provide the characteristic boron flame test color.

M in the formulas is a cation used to fulfill the valence of the boron-cage anion. Since M does not appear in the polymeric product, it is not critical and may be any of the following: hydrogen, ammonium or mono-, di-, or tri-substituted ammonium in which the substituents are hydrocarbyl of up to 12 carbons free of aliphatic unsaturation and in which at most only one such substituent is aryl. Preferably, all substituents are lower alkyl groups.

We claim:

1. A compound characterized by a recurring structural unit selected from the group consisting of $$M_a[H(B_{10}H_{8-b}X_bQ)_cB_{10}H_{9-b'}X_{b'}]_h$$

and

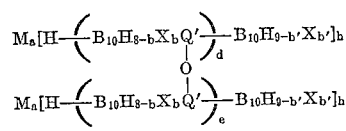

where:
M is a cation selected from the group consisting of hydrogen, hydronium, ammonium, substituted ammonium, sodium and cesium,
X is a radical selected from the group consisting of halogen, hydrocarbon, carboxyl, carbamyl, N-substituted carbamyl, halocarbonyl, halomethyl, hydroxy, hydrocarbyloxy, acetal, ketal, hydrocarbylcarbonyloxy, hydrocarbyloxycarbonyl, isocyanate, thiocyanate, isothiocyanate, hydrocarbylthio, hydroxymethyl, hydrocarbyloxymethyl, dihydrocarbylaminomethyl, cyano, amino, substituted amino, trihalomethyl, acyl, aldehyde, nitro, nitroso, azo, sulfo, sulfonyl, acetoxymercury and combinations thereof,
Q is

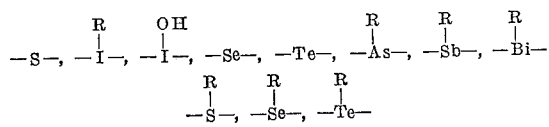

and mixtures thereof,
Q' is a trivalent radical selected from the group of As, Sb, Bi and mixtures thereof,
b is a positive whole number from 0 to 8, inclusive,
b' is a positive whole number from 0 to 9, inclusive,
a and h are positive whole numbers whose values are determined by the valence $(v_M)$ of M and the valence $(v_{bu})$ of bracketed unit such that $(v_M)(a)=(v_{bu})(h)$,
c, d and e are whole numbers, greater than zero, referring to the number of the respective parenthetical units in the compound,
R is a monovalent hydrocarbon radical.

2. A compound of claim 1 characterized by the recurring structural unit $$M_a[H(B_{10}H_{8-b}X_bQ)_cB_{10}H_{9-b'}X_{b'}]_h$$

where the letters have the same significance as in claim 1.

3. A compound of claim 2 having the formula $$M_a[H(B_{10}H_8Q)_cB_{10}H_9]_h$$

where the letters have the same significance as in claim 2.

4. A compound of claim 3 in which Q is an element from Group V of the Periodic Table of Elements having an atomic number of at least 15.

5. A compound of claim 3 in which Q is an element from Group VI of the Periodic Table of Elements having an atomic number of at least 15.

6. A compound of claim 3 in which Q is an element from Group VII of the Periodis Table of Elements having an atomic number of at least 15.

7. A compound of claim 1 having the recurring structural unit

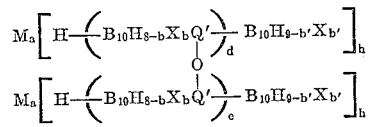

where the symbols have the same significance as in claim 1.

8. A compound of claim 7 having the formula

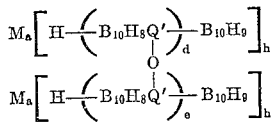

where the symbols have the same significance as in claim 7.

9. A compound of claim 8 in which Q' is an element from Group V of the Periodic Table of Elements having an atomic number of at least 15.

10. A process for preparing a polymer containing a $B_{10}$ boron-cage in the backbone thereof which comprises admixing with a solution containing $(H_3O)_2B_{10}H_{10}$ at a temperature below the boiling point of the solution the oxide having the formula

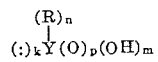

where:
(:) is a non-bonding electron pair attached to Y where Y is an element from Groups V, VI and VII of the Periodic Table of Elements having an atomic number of at least 15, $k$, $p$, $m$ and $n$ are small whole numbers representing the number of the respective parenthetical components in the oxide,
$k$ is 1,
$p$ is a number 0–3, inclusive,
$m$ is a number 0–3, inclusive,
$n$ is a number 0–1, inclusive,
$k+m+n+$(number of electron pairs bonding oxygen to Y)$=4$.

11. The process of claim 10 in which the oxide is a lower oxide of a Group V element, having an atomic number of at least 15.

12. The process of claim 10 in which the oxide is a lower oxide of a Group VI element, having an atomic number of at least 15.

13. The process of claim 10 in which the oxide is a lower oxide of a Group VII element, having an atomic number of at least 15.

14. The process of claim 10 in which the temperature is in the range of about 0°–50° C.

15. The process of claim 10 in which the oxide has the formula $$YO_2$$

and Y is a Group VI element, having an atomic number of at least 15.

16. The process of claim 10 in which the oxide has the formula $$Y_2O_3$$

and Y is a Group V element, having an atomic number of at least 15.

No references cited.

OSCAR R. VERTIZ, *Primary Examiner.*

MILTON WEISSMAN, *Examiner.*

H. S. MILLER, *Assistant Examiner.*